Patented Apr. 15, 1941

2,238,485

UNITED STATES PATENT OFFICE 2,238,485

AZO COMPOUND AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application November 4, 1939, Serial No. 302,924

9 Claims. (Cl. 260—205)

The present invention relates to azo compounds and to materials colored therewith. More particularly it relates to azo compounds having the general formula:

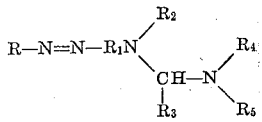

wherein R represents a benzene nucleus, $R_1$ represents a member selected from the group consisting of a benzene nucleus, and a naphthalene nucleus, $R_2$ represents a member selected from the group consisting of hydrogen, an alkyl group, a hydroxyalkyl group, a sulfoalkyl group, a phenyl group, and a phenylalkyl group, $R_3$ represents a member selected from the group consisting of hydrogen, an alkyl group, and a phenyl group, $R_4$ represents a member selected from the group consisting of hydrogen, an alkyl group, and an alkoxy alkyl group, and $R_5$ represents a member selected from the group consisting of an alkyl group, a hydroxyalkyl group, an alkoxyalkyl group, a sulfoalkyl group, and a phenyl group. The nucleus R may be substituted by one or more monovalent substituents selected from the group chlorine, bromine, fluorine, hydroxyl, acetyl, alkylsulfone, nitro, and similar kind of groups. The nucleus $R_1$ may likewise be substituted with one or more monovalent substituents such as chlorine, bromine, fluorine, an alkyl group, an alkoxy group, and an acylamino group.

The terms "alkyl," "hydroxyalkyl," "alkoxyalkyl," and "sulfoalkyl" as used in the specification and claims, unless otherwise specified, are intended to include groups such as methyl, ethyl, propyl, butyl, and the like, β-hydroxyethyl, β-hydroxypropyl, β,γ-dihydroxypropyl, ω-hydroxybutyl, methoxymethyl, methoxyethyl, methoxybutyl, ethoxymethyl, ethoxyethyl, β-sulfoethyl, β-sulfopropyl, and other similar kind of groups.

While the azo compounds of our invention are primarily concerned with the monoazo compounds, it will be understood that the polyazo compounds are likewise included within the scope of the invention. R in the above formula, for example, may be an azobenzene or a substituted azobenzene nucleus.

It is an object of our invention, therefore, to prepare the class of azo compounds above described and to color organic derivatives of cellulose, wool and silk, but more particularly cellulose esters such as cellulose acetate therewith.

The methods of preparation of the azo compounds of the invention are illustrated by the following examples.

Example 1

1 mole of o-chloroaniline is diazotized in the usual manner with sodium nitrite, the excess mineral acid neutralized with sodium carbonate, and the solution then added to a well-iced alcoholic solution of 1 mole of N-methyl-N-diethylaminomethyl-aniline. The coupling reaction is completed by adding sodium carbonate, after which the dye is precipitated with water, filtered off, washed and dried. Cellulose acetate is colored yellow shades from an aqueous suspension.

The azo compound obtained has the formula:

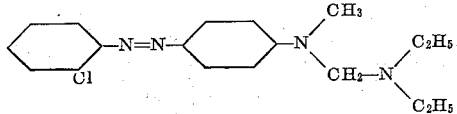

Example 2

1 mole of p-aminoacetophenone is diazotized and coupled with 1 mole of N-ethyl-N-di-β-methoxyethylaminomethyl-m-toluidine following the procedure described in Example 1. Cellulose acetate is colored orange from an aqueous suspension of the dye.

The azo compound obtained has the formula:

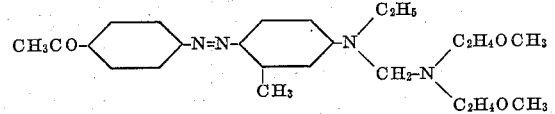

Example 3

1 mole of p-nitroaniline is diazotized and coupled with 1 mole of α-(phenyl-β-hydroxyethylamino-)-N-β-hydroxyethyl-ethylamine following the procedure described in Example 1. Cellulose acetate is colored orange-red shades from an aqueous suspension of the dye.

The azo compound obtained has the formula:

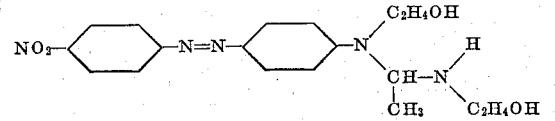

Example 4

1 mole of p-nitro-o-fluoroaniline is diazotized and coupled with 1 mole of α-(ortho-methoxyphenyl glycerylamino-)-N-ethyl-β-hydroxyethyl-propylamine following the procedure described in Example 1. Cellulose acetate is colored orange shades from an aqueous suspension of the dye.

The azo compound obtained has the formula:

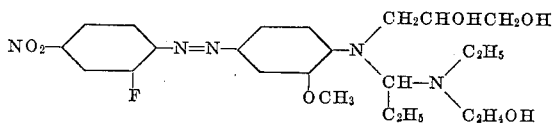

The invention is illustrated further by the following additional azo compounds which may be prepared in a manner similar to that described in Example 1. These compounds color cellulose acetate, silk and wool the shades of color designated.

pensions. If the particular dye is insoluble or only slightly soluble in water, it is first ground to a paste with a dispersing agent such as a soap, a sulfonated oil, or a higher fatty acid glyceryl sulfate, and the resulting paste then dispersed in water. The dispersion is raised to a temperature of about 45–55° C., the material to be colored is immersed therein, and the temperature gradually increased to about 80–85° C., at which point the material is worked for several hours. Salt may be added to facilitate exhaustion of the dye bath during the dyeing operation. When the material has attained the desired shade or condition of color, it is removed from the bath, washed with soap, rinsed and dried. If on the other hand the

| Azo compound | Shade of color |
|---|---|
| | Rubine on cellulose acetate, silk and wool. |
| | Do. |
| | Red on silk and wool. |
| | Blue on cellulose acetate. |
| | Do. |
| | Orange on cellulose acetate. |
| | Blue on cellulose acetate. |
| | Do. |
| | Do. |

In the application of the azo compounds of the invention to the coloration of organic derivatives of cellulose, the dyes are ordinarily applied to the materials from their aqueous solutions or suspensions. particular dye is water-soluble, the dying operation may be performed in an aqueous solution of the dye containing salt without the necessity of employing any kind of dispersing or solubilizing agent. A number of the azo dye compounds of the invention may be applied by still another method. For example, if the particular dye belongs to the group wherein R₂ is hydrogen, it may be applied to the fiber of the material to be colored in the manner above described, and then treated on the fiber with a dilute mineral acid which converts the dye to the free amino form represented by the general formula:

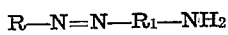

wherein R and R₁ each have the meanings previously defined. While still on the fiber, the free amino derivative is diazotized and condensed with a coupling component such as 2-hydroxy-3-naphthoic acid to yield an entirely new dye compound on the material. It is possible by this process to obtain various pattern effects by simply restricting the mineral acid treatment to the desired regions of the material.

While our invention is illustrated more particularly in connection with cellulose acetate, it will be understood that the azo dye compounds above described are not limited exclusively to cellulose acetate, but are likewise applicable to coloring organic derivatives of cellulose in general, including the hydrolyzed as well as the unhydrolyzed organic acid esters such as cellulose formate, cellulose propionate, cellulose butyrate, cellulose acetate-propionate, cellulose acetate-butyrate, and cellulose ethers such as methyl cellulose, ethyl cellulose, and benzyl cellulose.

We claim:

1. The non-sulfonated nuclear azo compounds having the general formula:

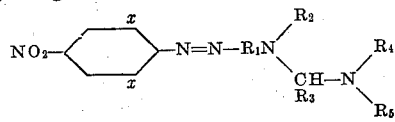

wherein each x represents a member selected from the group consisting of hydrogen, a halogen, and a nitro group, R₁ represents a benzene nucleus, R₂ represents a member selected from the group consisting of hydrogen, an alkyl group, a hydroxyalkyl group, a sulfoalkyl group, a phenyl group, and a phenylalkyl group, R₃ represents a member selected from the group consisting of hydrogen, an alkyl group, and a phenyl group, R₄ represents a member selected from the group consisting of hydrogen, an alkyl group, and an alkoxyalkyl group, and R₅ represents a member selected from the group consisting of an alkyl group, a hydroxyalkyl group, an alkoxyalkyl group, a sulfoalkyl group, and a phenyl group.

2. The non-sulfonated nuclear azo compounds having the general formula:

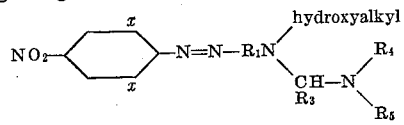

wherein each x represents a member selected from the group consisting of hydrogen, a halogen, and a nitro group, R₁ represents a benzene nucleus, R₃ represents a member selected from the group consisting of hydrogen, an alkyl group, and a phenyl group, R₄ represents a member selected from the group consisting of hydrogen, an alkyl group, and an alkoxyalkyl group, and R₅ represents a member selected from the group consisting of an alkyl group, a hydroxyalkyl group, an alkoxyalkyl group, a sulfoalkyl group, and a phenyl group.

3. The non-sulfonated nuclear azo compounds having the general formula:

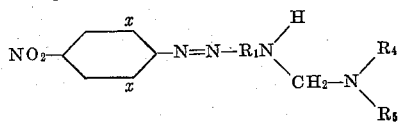

wherein each x represents a member selected from the group consisting of hydrogen, a halogen, and a nitro group, R₁ represents a benzene nucleus, R₄ represents a member selected from the group consisting of hydrogen, an alkyl group, and an alkoxyalkyl group, and R₅ represents a member selected from the group consisting of an alkyl group, a hydroxyalkyl group, an alkoxyalkyl group, a sulfoalkyl group, and a phenyl group.

4. Material made of or containing an organic derivative of cellulose colored with a dye selected from the class of non-sulfonated nuclear azo compounds having the general formula:

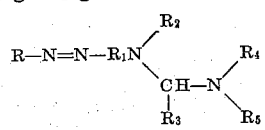

wherein R represents a benzene nucleus, R₁ represents a member selected from the group consisting of a benzene nucleus, and a naphthalene nucleus, R₂ represents a member selected from the group consisting of hydrogen, an alkyl group, a hydroxyalkyl group, a sulfoalkyl group, a phenyl group, and a phenylalkyl group, R₃ represents a member selected from the group consisting of hydrogen, an alkyl group, and a phenyl group, R₄ represents a member selected from the group consisting of hydrogen, an alkyl group, and an alkoxyalkyl group, and R₅ represents a member selected from the group consisting of an alkyl group, a hydroxyalkyl group, an alkoxyalkyl group, a sulfoalkyl group, and a phenyl group.

5. Material made of or containing cellulose acetate colored with a dye selected from the class of non-sulfonated nuclear azo compounds having the general formula:

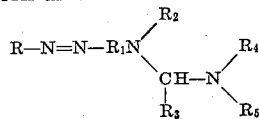

wherein R represents a benzene nucleus, R₁ represents a member selected from the group consisting of a benzene nucleus, and a naphthalene nucleus, R₂ represents a member selected from the group consisting of hydrogen, an alkyl group, a hydroxyalkyl group, a sulfoalkyl group, a phenyl group, and a phenylalkyl group, R₃ represents a member selected from the group consisting of hydrogen, an alkyl group, and a phenyl group, R₄ represents a member selected from the group consisting of hydrogen, an alkyl group, and an alkoxyalkyl group, and R₅ represents a member selected from the group consisting of an alkyl group, a hydroxyalkyl group, an alkoxyalkyl group, a sulfoalkyl group, and a phenyl group.

6. Material made of or containing an organic derivative of cellulose colored with a dye selected from the class of non-sulfonated nuclear azo compounds having the general formula:

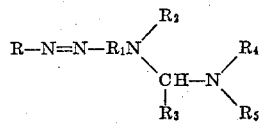

wherein R and R₁ each represents a benzene nucleus, R₂ represents a member selected from the group consisting of hydrogen, an alkyl group, a hydroxyalkyl group, a sulfoalkyl group, a phenyl group, and a phenylalkyl group, R₃ represents a member selected from the group consisting of hydrogen, an alkyl group, and a phenyl group, R₄ represents a member selected from the group consisting of hydrogen, an alkyl group, and an alkoxyalkyl group, and R₅ represents a member selected from the group consisting of an alkyl group, a hydroxyalkyl group, an alkoxyalkyl group, and a phenyl group.

7. Material made of or containing cellulose acetate colored with a dye selected from the class of non-sulfonated nuclear azo compounds having the general formula:

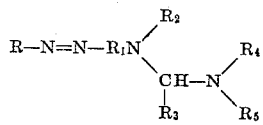

wherein R and R₁ each represents a benzene nucleus, R₂ represents a member selected from the group consisting of hydrogen, an alkyl group, a hydroxyalkyl group, a sulfoalkyl group, a phenyl group, and a phenylalkyl group, R₃ represents a member selected from the group consisting of hydrogen, an alkyl group, and a phenyl group, R₄ represents a member selected from the group consisting of hydrogen, an alkyl group, and an alkoxyalkyl group, and R₅ represents a member selected from the group consisting of an alkyl group, a hydroxyalkyl group, an alkoxyalkyl group, a sulfoalkyl group, and a phenyl group.

8. Material made of or containing an organic derivative of cellulose colored with a dye selected from the class of non-sulfonated nuclear azo compounds having the general formula:

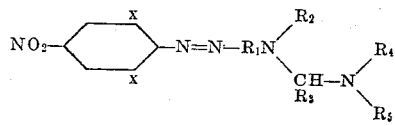

wherein each $x$ represents a member selected from the group consisting of hydrogen, a halogen, and a nitro group, R₁ represents a benzene nucleus, R₂ represents a member selected from the group consisting of hydrogen, an alkyl group, a hydroxyalkyl group, a sulfoalkyl group, a phenyl group, and a phenylalkyl group, R₃ represents a member selected from the group consisting of hydrogen, an alkyl group, and a phenyl group, R₄ represents a member selected from the group consisting of hydrogen, an alkyl group, and an alkoxyalkyl group, and R₅ represents a member selected from the group consisting of an alkyl group, a hydroxyalkyl group, an alkoxyalkyl group, and a phenyl group.

9. Material made of or containing cellulose acetate colored with a dye selected from the class of non-sulfonated nuclear azo compounds having the general formula:

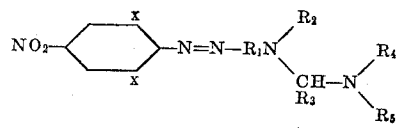

wherein each $x$ represents a member selected from the group consisting of hydrogen, a halogen, and a nitro group, R₁ represents a benzene nucleus, R₂ represents a member selected from the group consisting of hydrogen, an alkyl group, a hydroxyalkyl group, a sulfoalkyl group, a phenyl group, and a phenylalkyl group, R₃ represents a member selected from the group consisting of hydrogen, an alkyl group, and a phenyl group, R₄ represents a member selected from the group consisting of hydrogen, an alkyl group, and an alkoxyalkyl group, and R₅ represents a member selected from the group consisting of an alkyl group, a hydroxyalkyl group, an alkoxyalkyl group, a sulfoalkyl group, and a phenyl group.

JOSEPH B. DICKEY.
JAMES G. McNALLY.